United States Patent [19]
Sakaguchi et al.

[11] Patent Number: 5,618,783
[45] Date of Patent: Apr. 8, 1997

[54] SYNTHESIZED INORGANIC ION EXCHANGE MATERIAL AND DETERGENT COMPOSITION CONTAINING THE SAME

[75] Inventors: Mikio Sakaguchi; Ichiro Sakamoto; Ryuichi Akagi; Shu Yamaguchi; Masaki Tsumadori, all of Wakayama, Japan

[73] Assignee: KAO Corporation, Tokyo, Japan

[21] Appl. No.: 395,994

[22] Filed: Feb. 28, 1995

[30] Foreign Application Priority Data

Mar. 3, 1994 [JP] Japan .................. 6-060142

[51] Int. Cl.⁶ .................. C11D 7/02; C11D 7/14
[52] U.S. Cl. .................. 510/507; 510/405; 510/511; 510/531; 423/331; 423/332
[58] Field of Search .................. 252/89.1, 174.25; 423/331, 332; 510/405, 507, 511, 531

[56] References Cited

U.S. PATENT DOCUMENTS

| | | | |
|---|---|---|---|
| 4,105,574 | 8/1978 | Culmone et al. | 252/154 |
| 4,264,466 | 4/1981 | Carleton et al. | 252/99 |
| 4,277,457 | 7/1981 | Taga et al. | 423/331 |
| 4,321,157 | 3/1982 | Harris et al. | 252/174.25 |
| 4,595,520 | 6/1986 | Heile et al. | 252/160 |
| 4,664,839 | 5/1987 | Rieck | 252/175 |
| 4,820,439 | 4/1989 | Rieck | 252/135 |
| 5,004,716 | 4/1991 | Ogawa et al. | 501/141 |
| 5,108,646 | 4/1992 | Beerse et al. | 252/174.25 |
| 5,427,711 | 6/1995 | Sakaguchi | 252/174.25 |

FOREIGN PATENT DOCUMENTS

| | | |
|---|---|---|
| 488868 | 6/1992 | European Pat. Off. . |
| 550048 | 7/1993 | European Pat. Off. . |
| 2434117 | 7/1979 | France . |
| 227616 | 9/1985 | Germany . |
| 279234 | 5/1990 | Germany . |
| 50-12381 | 2/1975 | Japan . |
| 51-12805 | 1/1976 | Japan . |
| 60-239320 | 11/1985 | Japan . |
| 61-59245 | 12/1986 | Japan . |
| 2055214 | 2/1990 | Japan . |
| 2271910 | 11/1990 | Japan . |
| 393649 | 4/1991 | Japan . |
| 5279013 | 10/1993 | Japan . |
| 247265 | 3/1967 | U.S.S.R. . |
| 2226553 | 12/1988 | United Kingdom . |

OTHER PUBLICATIONS

Johan et al., Bull. Soc. fr. Mineral. Cristallogr., 95, pp. 371–382 (1972).

Beneke et al., American Mineralogist, 62, pp. 763–771 (1977).

Primary Examiner—Douglas J. McGinty
Assistant Examiner—Gregory R. Delcotto
Attorney, Agent, or Firm—Birch, Stewart, Kolasch & Birch, LLP

[57] ABSTRACT

The synthesized inorganic crystalline ion exchange material has a composition represented by the following general formula in an anhydride form:

$$aX_2O \cdot bSiO_2 \cdot cX'O,$$

wherein X represents Na and K; X' represents Ca, or Ca and Mg; b/a is 1.4 to 2.1; c/a is 0.001 to 0.35; K/Na in $X_2O$ is 0.09 to 1.11; Mg/Ca in X'O is 0 to 100; and $K_2O/SiO_2$ is 0.06 to 0.25. The synthesized inorganic crystalline ion exchange material exhibits main shift peaks at least at 1080±6 cm⁻¹ in Raman scattering spectra in the range of from 900 to 1200 cm⁻¹. The inorganic ion exchange material of the present invention is excellent in cationic exchange capacity, cationic exchange speed, and anti-solubility, making it useful to be used for a water softener and an alkalinity adjusting agent in detergents.

8 Claims, 7 Drawing Sheets

SYNTHESIZED INORGANIC ION EXCHANGE MATERIAL AND DETERGENT COMPOSITION CONTAINING THE SAME

BACKGROUND OF THE INVENTION

1. Field of the Invention

The present invention relates to a synthesized inorganic ion exchange material and a detergent composition containing the same, and more specifically to a synthesized inorganic ion exchange material excellent in ion exchange capacity, alkaline capacity, and cationic exchange speed, and having anti-solubility in water, and a detergent composition containing such a synthesized inorganic ion exchange material.

2. Discussion of the Related Art

To date, a large number of chelating agents, ion exchange materials, precipitants, dispersants and other substances have been reported to be used for detergent builders. In recent years, the use of tripolyphosphates has decreased, since they can cause eutrophication in closed freshwater areas such as lakes and marshes. Instead, crystalline aluminosilicates, typically those disclosed in Japanese Patent Laid-Open Nos. 50-12381 and 51-12805, have been commonly used.

Although sodium silicate has an ion exchange capacity not less than that of zeolite, its use has been limited since it is soluble in water. As a means for solving this problem, a method in which sodium silicate is thermally dehydrated, baked, and powdered and methods utilizing the obtained product are disclosed in Japanese Patent Laid-Open Nos. 60-239320 and 60-227895 and U.S. Pat. Nos. 4,664,839 and 5,211,930. Also, a method in which part of the silicon of sodium silicate is isomorphously replaced with aluminum in a similar manner is disclosed in Japanese Patent Laid-Open No. 3-93649. However, both methods have problems in that the obtained anti-solubility is insufficient and the ion exchange capacity is low. Also, crystalline calcium silicate alkali hydrates obtained by hydrothermal synthesis are disclosed in Japanese Patent Examined Publication No. 61-59245, but they are substantially unsuitable as detergent builders because of their low ion exchange capacity, though they have sufficient anti-solubility in water. Moreover, because their grain shape is in the form of coarse long fibers or mica, their aqueous dispersibility is low so that the actual ion exchange capacity shows further reduction. Also, DD-279234A1 publication discloses a crystalline magnesium-containing silicate obtained by hydrothermal synthesis, but there is a problem in that this silicate is extremely low in ion exchange capacity, making it impossible to be practically used as a detergent builder.

Japanese Patent Laid-Open No. 5-279013 (corresponding to EP-A-0,550,048) discloses an inorganic ion exchange material having excellent anti-solubility in water and ion exchange capacity which contains an alkaline earth metal. However, this publication does not teach or appreciate the usefulness of high ion exchange speed. An ion exchange material having a high ion exchange speed is able to capture Ca ions in water for washing in a short period of time, so that the ion exchange material serves to aid the action of surfactants. Therefore, it can be suitably used for builders in detergents. Such a high-ion exchange speed silicate has not been conventionally known.

As described above, it has been difficult to obtain an inorganic ion exchange material which is excellent in both ion exchange speed and ion exchange capacity, and the development of such an inorganic ion exchange material having improvements in these properties has been in demand.

SUMMARY OF THE INVENTION

Accordingly, it is an object of the present invention to provide a synthesized inorganic crystalline ion exchange material and a hydrate thereof which are excellent in ion exchange capacity, alkaline capacity, and cationic exchange speed and has anti-solubility in water.

Another object of the present invention is to provide a detergent composition containing the above-mentioned synthesized inorganic crystalline ion exchange material.

The present invention is concerned with the following:

(1) A synthesized inorganic crystalline ion exchange material comprising a composition having the following general formula in an anhydride form:

$$aX_2O \cdot bSiO_2 \cdot cX'O,$$

wherein X represents Na and K; X' represents Ca, or Ca and Mg; b/a is 1.4 to 2.1; c/a is 0.001 to 0.35; K/Na in $X_2O$ is 0.09 to 1.11; Mg/Ca in X'O is 0 to 100; and $K_2O/SiO_2$ is 0.06 to 0.25, wherein the synthesized inorganic crystalline ion exchange material exhibits an X-ray diffraction pattern shown in any one of Tables 1 to 4;

(2) A synthesized inorganic crystalline ion exchange material comprising a composition having the following general formula in an anhydride form:

$$aX_2O \cdot bSiO_2 \cdot cX'O,$$

wherein X represents Na and K; X' represents Ca, or Ca and Mg; b/a is 1.4 to 2.1; c/a is 0.001 to 0.35; K/Na in $X_2O$ is 0.09 to 1.11; Mg/Ca in X'O is 0 to 100; and $K_2O/SiO_2$ is 0.06 to 0.25, wherein the synthesized inorganic crystalline ion exchange material exhibits main shift peaks at least at $1080\pm6$ cm$^{-1}$ in Raman scattering spectra in the range of from 900 to 1200 cm$^{-1}$; and particularly, (3) A synthesized inorganic crystalline ion exchange material comprising a composition having the following general formula in an anhydride form:

$$aX_2O \cdot bSiO_2 \cdot cX'O,$$

wherein X represents Na and K; X' represents Ca, or Ca and Mg; b/a is 1.4 to 2.1; c/a is 0.002 to 0.20; K/Na in $X_2O$ is 0.09 to 1.11; Mg/Ca in X'O is 0 to 100; and $K_2O/SiO_2$ is 0.06 to 0.25, wherein the synthesized inorganic crystalline ion exchange material exhibits main shift peaks at least at $1080\pm6$ cm$^{-1}$ in Raman scattering spectra in the range of from 900 to 1200 cm$^{-1}$; and (4) A detergent composition containing the synthesized inorganic crystalline ion exchange material as described in any one of (1) to (3) above.

DETAILED DESCRIPTION OF THE INVENTION

Figure 1:
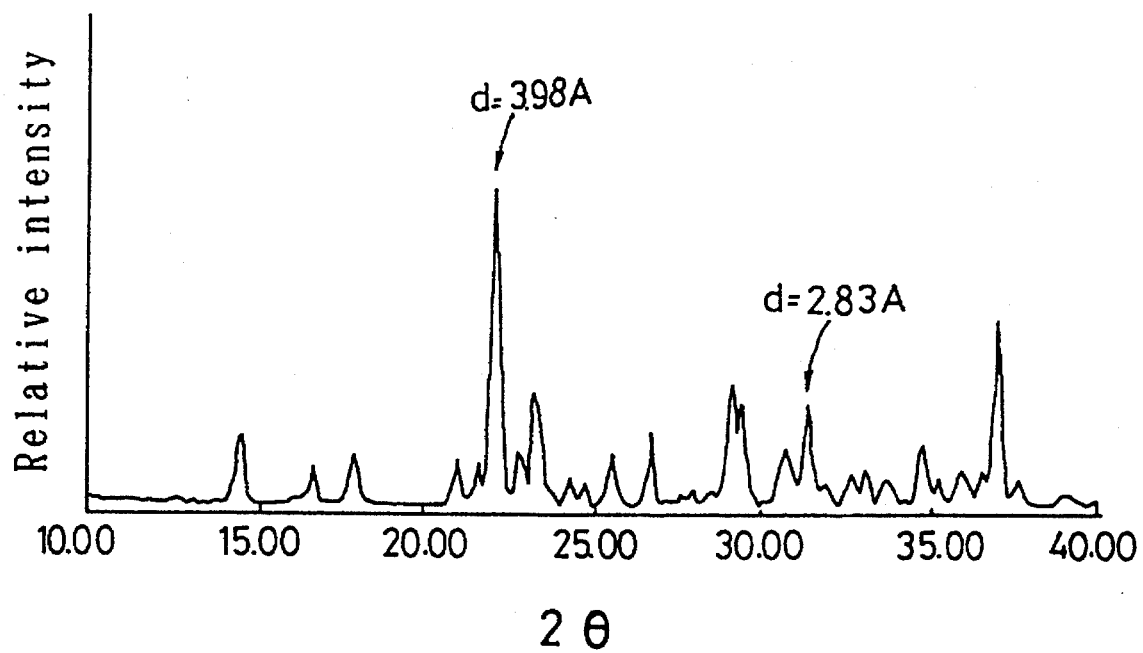
FIG. 1 is an X-ray diffraction pattern obtained by X-ray diffraction analysis of the inorganic ion exchange material obtained in Example 5.

The synthesized inorganic ion exchange materials of the present invention will be explained in detail.

The synthesized inorganic ion exchange material has a composition having the following general formula in an anhydride form:

$$aX_2O \cdot bSiO_2 \cdot cX'O$$

wherein X represents Na and K, and X' represents Ca, or Ca and Mg. b/a is 1.4 to 2.1, preferably 1.5 to 1.9, more preferably 1.6 to 1.85. When b/a is less than 1.4, the resulting inorganic ion exchange material has insufficient anti-solubility in water, and when it exceeds 2.1, the resulting inorganic ion exchange material has low ion exchange capacity, thereby making it insufficient to be used as an ion exchange material. c/a is 0.001 to 0.35, preferably 0.002 to 0.20, more preferably 0.005 to 0.10. When c/a is less than 0.001, the resulting inorganic ion exchange material has insufficient anti-solubility in water, and when it exceeds 0.35, the resulting inorganic ion exchange material has low ion exchange capacity, thereby making it insufficient to be used as an ion exchange material. With respect to a, b and c, there are no limitations, provided that b/a and c/a have the above relationships. When $aX_2O$, for example, is a 'Na$_2$O·a''K$_2$O, a equals to a'+a''. Likewise, when cX'O, for example, is c'CaO·c''MgO, c equals to c'+c''.

With respect to increased cationic exchange speed, K/Na is normally 0.09 to 1.11, preferably 0.12 to 0.72, and more preferably 0.16 to 0.60, and with respect to increased cationic exchange capacity, Mg/Ca is normally 0 to 100, preferably 0.005 to 20, and more preferably 0.01 to 10.

Also, $K_2O/SiO_2$ is 0.06 to 0.25, preferably 0.08 to 0.20, more preferably 0.10 to 0.18. By keeping $K_2O/SiO_2$ in the above-specified range, the resulting inorganic ion exchange material has a remarkably improved cationic exchange speed.

While not being bound to any theory, it is believed that the inclusion of K atoms results in crystalline structure which has a larger radius size. This larger radius size results in an increase in the ion exchange speed of the ion exchange material.

Thus, as a preferred embodiment, a synthesized inorganic ion exchange material comprising a composition having the following general formula in an anhydride form is exemplified:

$$aX_2O \cdot bSiO_2 \cdot cX'O,$$

wherein X represents Na and K; X' represents Ca, or Ca and Mg; b/a is 1.4 to 2.1; c/a is 0.002 to 0.20; K/Na in $X_2O$ is 0.09 to 1.11; Mg/Ca in X'O is 0 to 100; and $K_2O/SiO_2$ is 0.06 to 0.25.

The synthesized inorganic ion exchange material of the present invention has a crystalline structure with an X-ray diffraction pattern shown in any one of Tables 1 to 4. In Tables 1 to 4, d is calculated from the equation $2d \cdot \sin\theta = n\lambda$, wherein n is equal to 1, and $\lambda$ is 1.54 Å, i.e. the characteristic X-ray wavelength of CuKα.

TABLE 1

| d | Relative intensity |
| --- | --- |
| 6.03 | M |
| 3.98 | VS |
| 3.78 | M |
| 3.31 | WM |
| 3.04 | M |
| 3.01 | M |
| 2.89 | WM |
| 2.83 | M |
| 2.57 | WM |
| 2.42 | S |

Relative intensity
VS = 100–75, S = 75–50, M = 50–25, WM = 25–10

TABLE 2

| d | Relative intensity |
| --- | --- |
| 5.99 | M |
| 4.22 | WM |
| 4.08 | M |
| 3.97 | S |
| 3.77 | S |
| 3.45 | M |
| 3.04 | M |
| 3.00 | M |
| 2.89 | M |
| 2.83 | S |
| 2.42 | VS |

Relative intensity
VS = 100–75, S = 75–50, M = 50–25, WM = 25–10

TABLE 3

| d | Relative intensity |
| --- | --- |
| 5.98 | M |
| 5.26 | WM |
| 4.31 | M |
| 4.23 | M |
| 4.08 | VS |
| 3.98 | WM |
| 3.77 | S |
| 3.55 | WM |
| 3.51 | M |
| 3.46 | M |
| 3.12 | WM |
| 3.04 | S |
| 2.99 | S |
| 2.89 | M |
| 2.83 | VS |
| 2.80 | M |
| 2.60 | WM |
| 2.57 | M |
| 2.51 | M |
| 2.42 | VS |

Relative intensity
VS = 100–75, S = 75–50, M = 50–25, WM = 25–10

TABLE 4

| d | Relative intensity |
| --- | --- |
| 5.99 | M |
| 4.23 | M |
| 4.08 | VS |
| 3.98 | M |
| 3.77 | S |
| 3.51 | WM |
| 3.46 | M |
| 3.13 | M |
| 2.99 | M |
| 2.89 | S |
| 2.83 | VS |
| 2.61 | WM |
| 2.52 | M |
| 2.42 | VS |

Relative intensity
VS = 100–75, S = 75–50, M = 50–25, WM = 25–10

Figure 5:
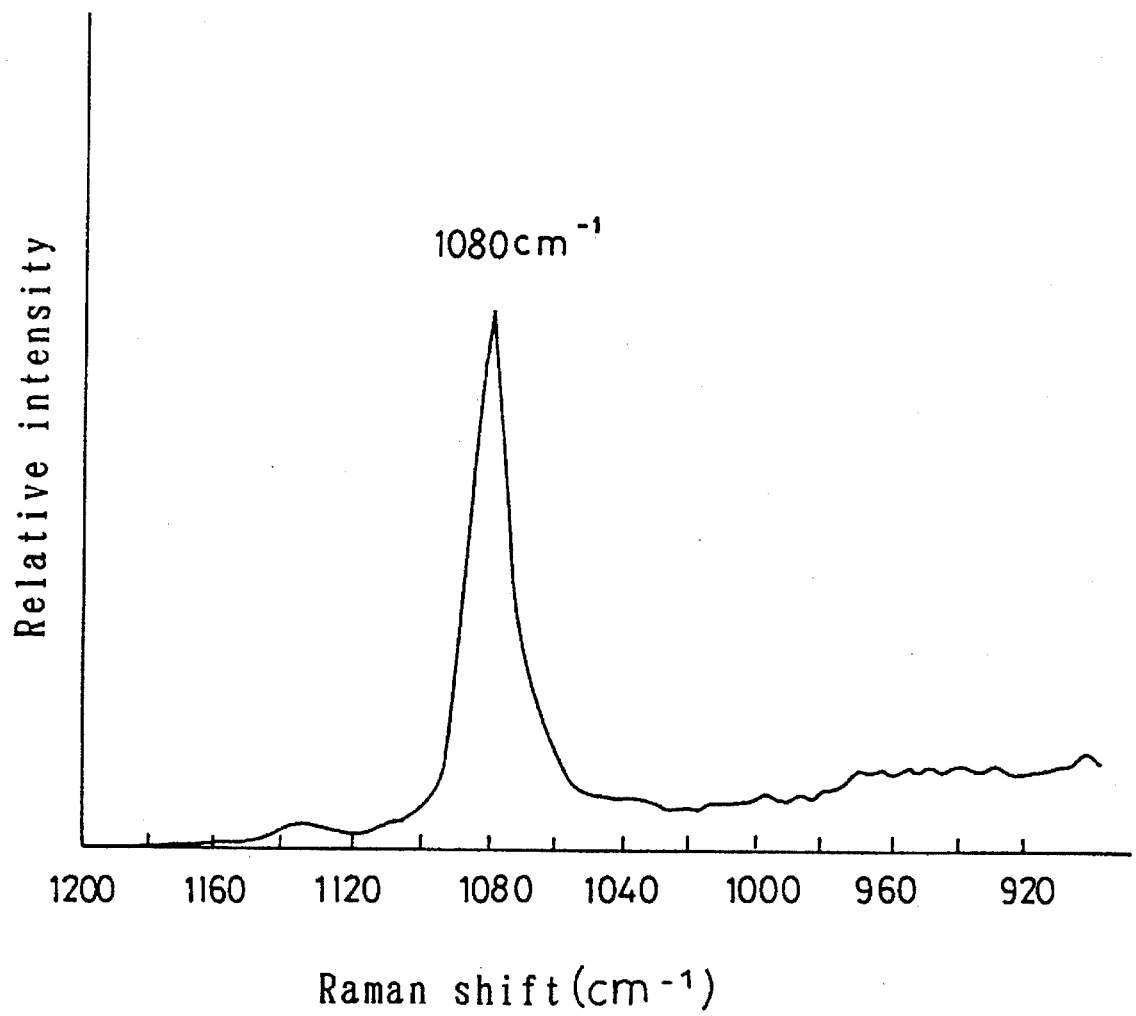
FIG. 5 is a Raman spectrum obtained by Raman spectrometry measurement of the inorganic ion exchange material obtained in Example 9.
Figure 6:
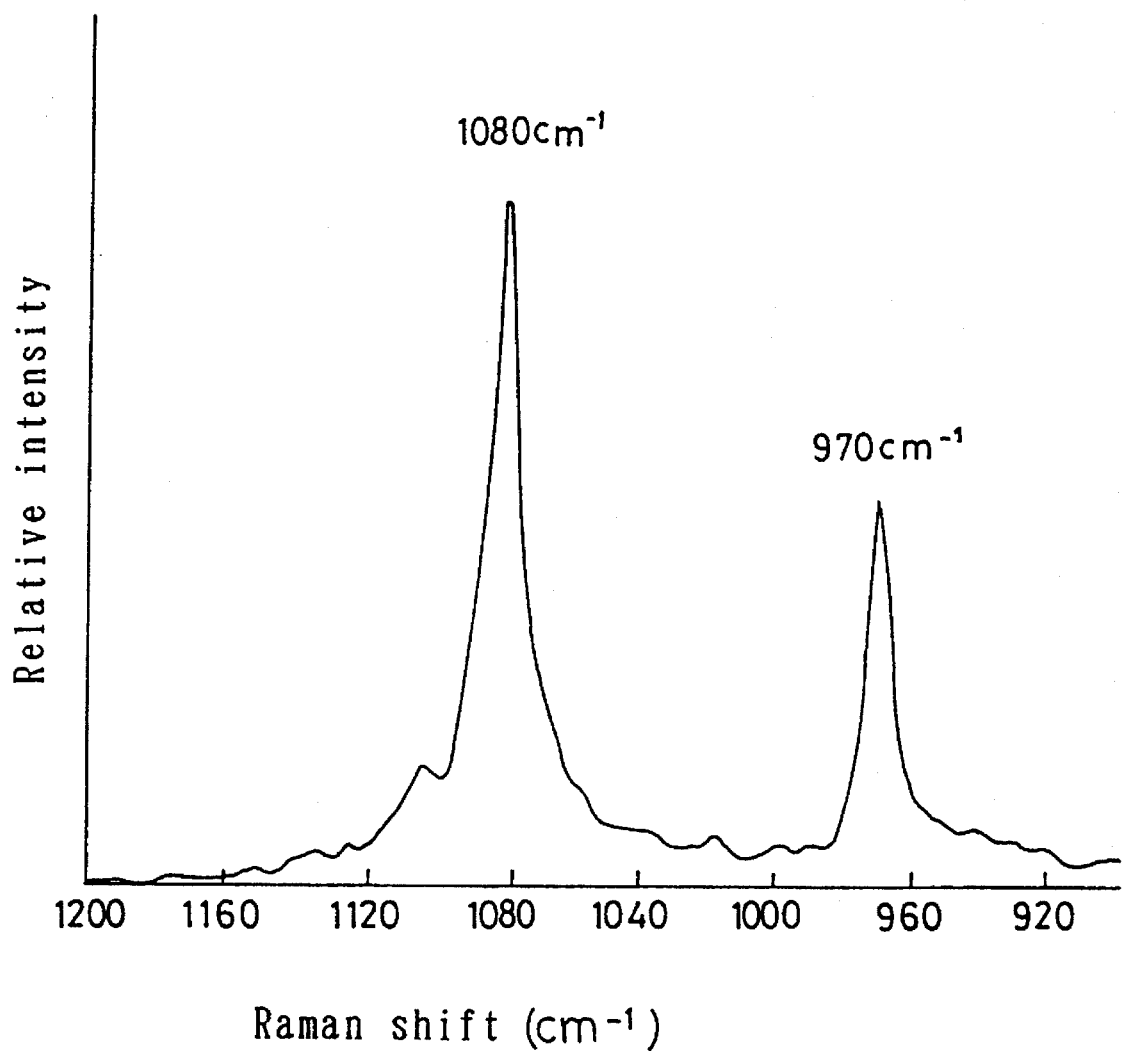
FIG. 6 is a Raman spectrum obtained by Raman spectrometry measurement of the inorganic ion exchange material obtained in Example 7.

The synthesized inorganic ion exchange material of the present invention exhibits at least one peak at 1080±6 cm$^{-1}$ in Raman scattering spectra in the range of from 900 to 1200 cm$^{-1}$. For instance, there may be cases where Raman shift peaks are found at both 968±6 cm$^{-1}$ and 1080±6 cm$^{-1}$ (see, for instance, FIG. 6), or cases where Raman shift peak is found at 1080±6 cm$^{-1}$ alone (see, for instance, FIG. 5).

The inorganic ion exchange material of the present invention described above is obtained by chemical synthesis, which comprises three components, $X_2O$, $SiO_2$, and $X'O$ as indicated by the general formula. Materials which can be converted as each of these components, therefore, are indispensable as starting materials for producing the inorganic ion exchange material of the present invention. In the present invention, known compounds can be appropriately used as starting materials without limitations. Examples of the $X_2O$ component and the $X'O$ component include simple or complex oxides, hydroxides, and salts of respective elements; and minerals containing respective elements. Specifically, examples of the starting materials for the $X_2O$ component include NaOH, KOH, $Na_2CO_3$, $K_2CO_3$, and $Na_2SO_4$. Examples of the starting materials for the $X'O$ component include $CaCO_3$, $Ca(OH)_2$, $Cacl_2$, $Ca(NO_3)_2$, $MgCO_3$, $Mg(OH)_2$, MgO, $MgCl_2$, $Mg(NO_3)_2$, and dolomite. Examples of the starting materials for the $SiO_2$ component include silica, silica sand, cristobalite, kaolin, talc, fused silica, and sodium silicate.

In the present invention, a method of producing the synthesized inorganic ion exchange material may be exemplified by mixing these starting material components to provide the desired compositions for the synthesized inorganic ion exchange material, and baking the resulting mixture at a temperature in the range of normally from 300° to 1300° C., preferably from 500° to 1000° C., more preferably from 600° to 900° C., to crystallize it. Alternative methods may also be exemplified by mixing in the same manner as above, melting the mixture at a temperature of 1100° to 1600° C. to yield a glassified product, followed by baking, or melting to produce a water glass and baking it. In this case, when the heating temperature is less than 300° C., the crystallization is insufficient, thereby making the anti-solubility of the resulting inorganic ion exchange material poor, and when it exceeds 1300° C., coarse grains and non-crystalline phases are likely to be formed, thereby decreasing the ion exchange capacity of the resulting inorganic ion exchange material. The heating time is normally 0.1 to 24 hours. Such baking can normally be carried out in a heating furnace such as an electric furnace or a gas furnace. The baked product may be milled as necessary to a given granularity. This milling is achieved using a ball mill, a roller mill or another mechanical mill. The average particle size of the ion exchange material powder is preferably 0.1 to 100 μm.

The synthesized inorganic ion exchange material of the present invention having the structural characteristics as described above can be obtained by the above-mentioned processes.

The inorganic ion exchange material of the present invention may be a hydrate, wherein the amount of hydration is normally 0 to 20 moles of $H_2O$ in the above general formula.

The hydrate of the inorganic ion exchange material of the present invention can easily be prepared by any known methods without limitations. For example, a hydrate of an inorganic ion exchange material can be obtained by suspending the anhydride of the above inorganic ion exchange material in ion exchanged water to form a hydrate, and dried to yield a powder.

The properties of the synthesized inorganic ion exchange material of the present invention will now be described hereinbelow.

The inorganic ion exchange material of the present invention or the hydrate thereof thus obtained has an ion exchange capacity of at least 240 to 600 $CaCO_3$ mg/g, preferably 250 to 600 $CaCO_3$ mg/g. The term "ion exchange capacity" used herein is a value obtained by the measurement method described below in the Examples. The synthesized inorganic ion exchange material of the present invention has excellent cationic exchange speed of 110 to 250 $CaCO_3$ mg/g, minute, preferably 120 to 240 $CaCO_3$ mg/g.minute.

In the present invention, the term "anti-solubility" or "anti-solubility in water" refers to the stability of the inorganic ion exchange material in water. Accordingly, when the anti-solubility is insufficient, the stability in water is poor, leading to an increase in the amount of Si dissolved in water. By contrast, the term "anti-solubility in water is excellent" means that the stability in water of the inorganic ion exchange material is good, leading to a remarkable lowering in the amount of Si dissolved in water.

In the synthesized inorganic ion exchange material of the present invention, the amount of Si dissolved in water is normally not more than 250 mg/g, when calculated as $SiO_2$, which can be said to be substantially insoluble in water. Here, the term "substantially insoluble in water" means stability in water of the chemical structure concerned with the cationic exchange capacity, so that the amount of Si dissolved, when calculated as $SiO_2$, is normally less than 200 mg/g when a 2 g sample is added to 100 g of ion exchanged water and the mixture is stirred at 25° C. for 30 minutes.

Furthermore, the synthesized inorganic ion exchange material of the present invention is excellent in the alkaline capacity. Here, "alkaline capacity" refers to the capacity of buffering action to acids. In the synthesized inorganic ion exchange material of the present invention, even when 15 ml of 0.25N hydrochloric acid is added to a 1000 ml of aqueous dispersion having a concentration of 0.1% by weight ion exchange material, the solution has a pH of 9 to 12. Moreover, the inorganic ion exchange material is also excellent in alkaline buffering effect, having a superior alkaline buffering effect to those of sodium carbonate or ordinary amorphous sodium silicate.

Since the inorganic ion exchange materials of the present invention possess excellent ion capturing capacity and stability in water, the detergent compositions of the present invention containing such inorganic ion exchange materials possess excellent washing performance.

The detergent composition of the present invention contains at least the inorganic ion exchange material described above and/or a hydrate thereof. Although the detergent compositions of the present invention can be used without particular restriction, they may be used as clothes detergents, softeners, tableware detergents, house detergents used for floor cleaning and bathroom cleaning, toothpastes, body detergents and metalware detergents.

In the present invention, the amount of the above-mentioned inorganic ion exchange material and/or the hydrate thereof is normally 0.1 to 90% by weight, preferably 0.5 to 80% by weight, more preferably 1 to 75% by weight in the whole composition. When the amount is lower than 0.1% by weight, sufficient washing performance cannot be achieved. When it exceeds 90% by weight, the dispersability of the inorganic ion exchange material becomes poor.

Particularly in the case where the inorganic ion exchange material is used for a clothes detergent, the amount of the synthesized inorganic ion exchange material is normally 0.1 to 70% by weight, preferably 1 to 60% by weight, more preferably 2 to 55% by weight. When the amount is less than 0.1% by weight, sufficient effects of the inorganic ion exchange material cannot be achieved in the composition. When it exceeds 70% by weight, the amounts of the other components contained in the detergent are restricted, thereby making the balance of the components poor as a detergent.

The detergent composition of the present invention usually contains one or more surfactants. The surfactant used in the present invention is not limitative to particular ones as long as they are those generally used for detergents. Specifically, they may be one or more surfactants selected from the group consisting of anionic surfactants, nonionic surfactants, cationic surfactants and ampholytic surfactants. For instance, surfactants can be chosen such that the surfactants of the same kind are chosen, as in the case where a plurality of anionic surfactants are chosen. Alternatively, surfactants of different kinds are chosen, as in the case where an anionic surfactant and a nonionic surfactant are respectively chosen. The amount of the surfactants is normally 0.1 to 90% by weight.

Further, in the present invention, various kinds of additives conventionally used for detergents may be suitably added. In these cases, the additives are not limitative to particular ones as long as they are those generally used for detergents. Examples of the additives include other inorganic ion exchange materials such as zeolite, sodium tripolyphosphate and sodium metaphosphate, amorphous aluminosilicates, amorphous silicates, sodium carbonate, amorphous silicas, clayey minerals, bleaching agents and enzymes.

The detergent composition of the present invention comprising the components mentioned above may be produced by any of the conventionally known methods, without being limitative to particular ones. Examples of methods for producing high bulk density detergents include those disclosed in Japanese Patent Laid-Open Nos.61-69897, 61-69899 and 61-69900 and EP513824A.

The inorganic ion exchange material of the present invention is excellent in both cationic exchange capacity and anti-solubility, making it useful to be used for a water softener and an alkalinity adjusting agent in detergents. Also, it can be used as an oil-absorbing carrier. Therefore, the detergent composition of the present invention containing such an inorganic ion exchange material offers excellent washing effects and is suitable for the concentration of detergent.

EXAMPLES

The present invention will be further described by means of the following working examples, comparative examples, detergent compositions, comparative detergent compositions and test examples, without intending to restrict the scope of the present invention thereto.

The measurements shown in Examples and Comparative Examples are obtained as follows:
(1) Cationic exchange capacity (CEC)

A 0.1 g sample is accurately weighed and added to 100 ml of a calcium chloride aqueous solution (500 ppm concentration, when calculated as $CaCO_3$), followed by stirring at 25° C. for 60 minutes, after which the mixture is filtered using Membrane Filter (made of nitrocellulose; manufactured by Advantech) of 0.2 μm pore size. 10 ml of the filtrate is assayed for Ca content by an EDTA titration, and the calcium ion exchange capacity (cationic exchange capacity) of the sample is calculated from the titer.
(2) Cationic exchange speed (CE Speed)

Figure 2:
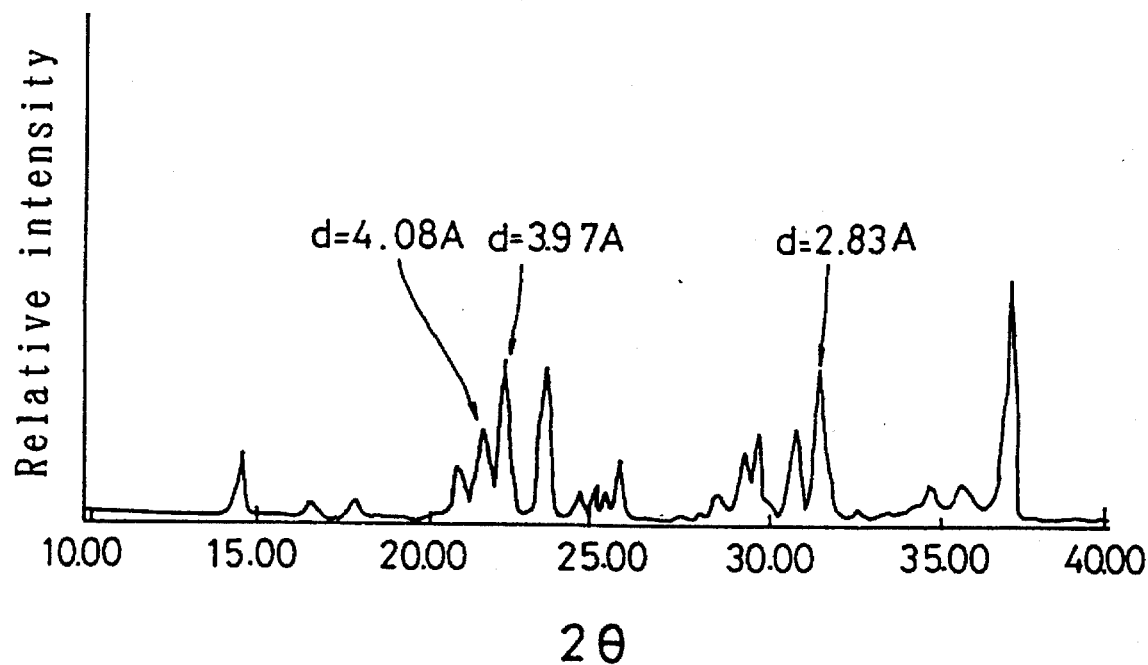
FIG. 2 is an X-ray diffraction pattern obtained by X-ray diffraction analysis of the inorganic ion exchange material obtained in Example 14.
Figure 3:
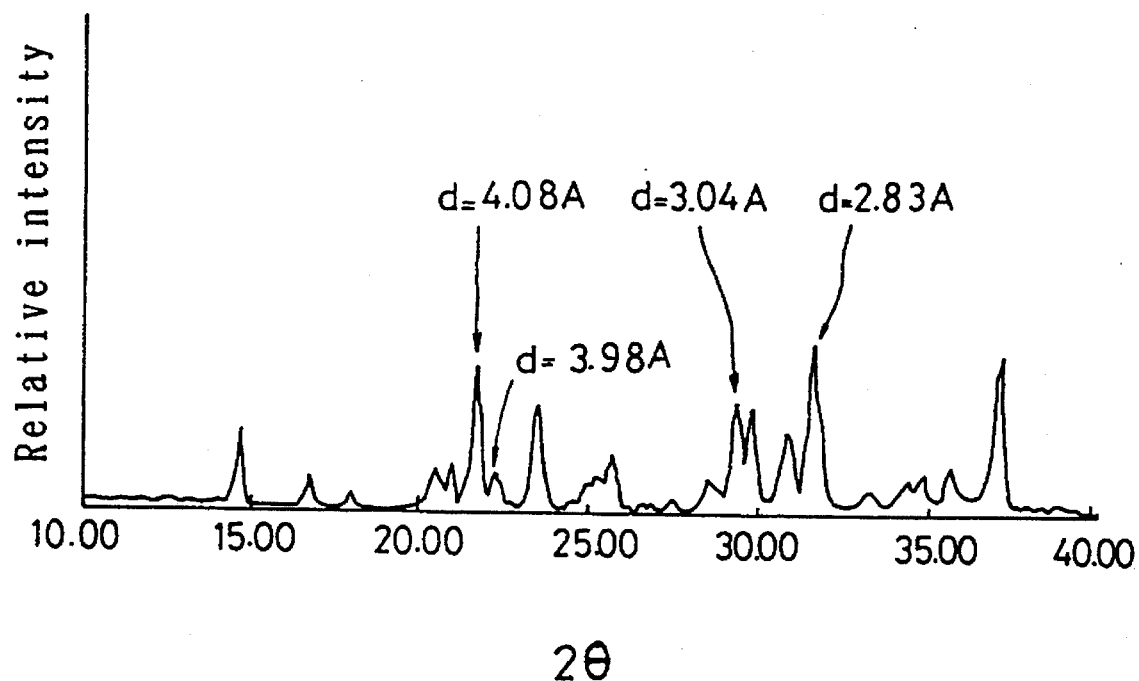
FIG. 3 is an X-ray diffraction pattern obtained by X-ray diffraction analysis of the inorganic ion exchange material obtained in Example 7.
Figure 4:
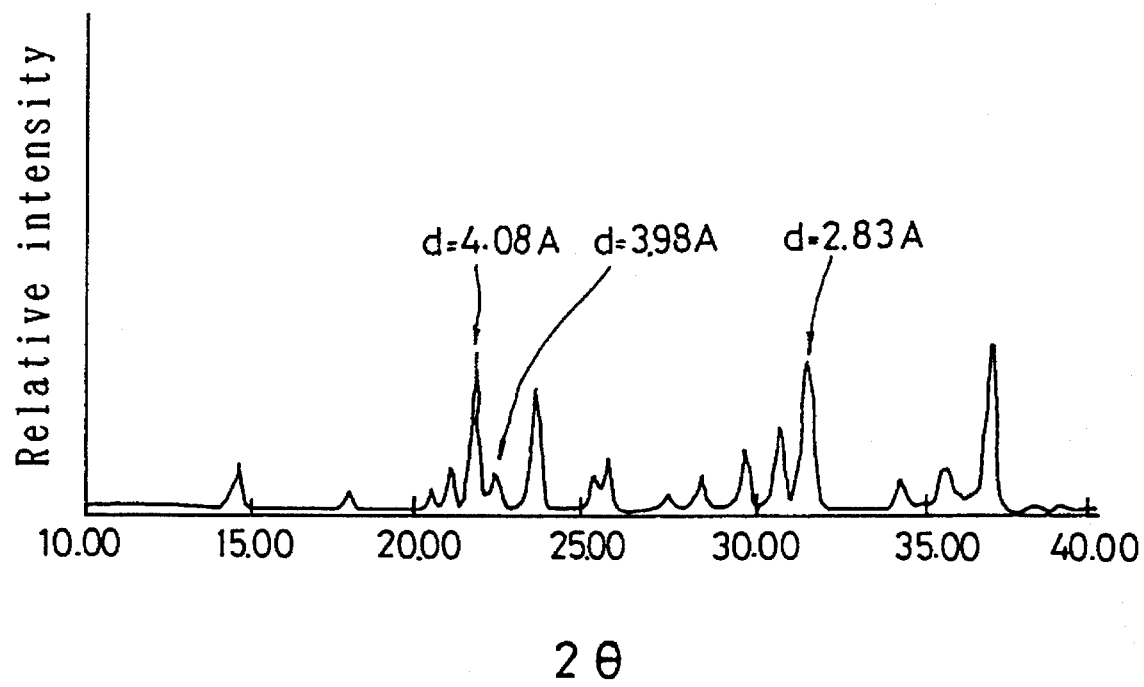
FIG. 4 is an X-ray diffraction pattern obtained by X-ray diffraction analysis of the inorganic ion exchange material obtained in Example 9.
Figure 7:
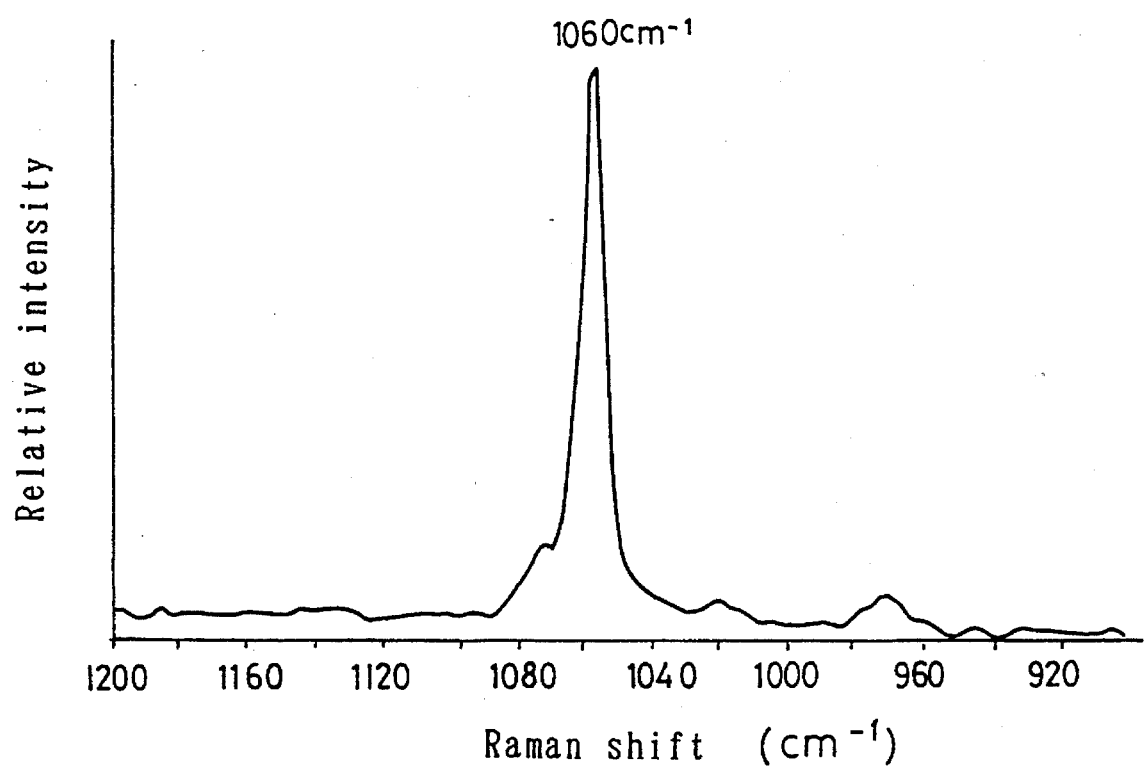
FIG. 7 is a Raman spectrum obtained by Raman spectrometry measurement of the inorganic ion exchange material obtained in Comparative Example 1.

A 0.04 g sample milled to have an average particle size of 10±2 μm (measured with a laser diffraction particle size distribution analyzer LA-50 manufactured by Horiba Seisakusho) is accurately weighed and added to 100 ml of a calcium chloride aqueous solution (100 ppm concentration, when calculated as $CaCO_3$), followed by stirring at 10° C. for one minute, after which the mixture is filtered using Membrane Filter of 0.2 μm pore size. 10 ml of the filtrate is assayed for Ca content by an EDTA titration, and the calcium ion exchange capacity of the sample is calculated from the titer. The calcium ion exchange capacity (cationic exchange capacity) per one minute is defined as cationic exchange speed.
(3) X-ray diffraction pattern The analysis by X-ray diffraction is conducted using an X-ray diffractometer (Model RAD-200 manufactured by Rigaku Industrial Corporation; CuK beam, 40 kV, 80 mA). The X-ray diffraction pattern of the inorganic ion exchange material powder 5 obtained in Example 5 (corresponding to Table 1) is shown in FIG. 1, that of the inorganic ion exchange material powder 14 obtained in Example 14 (corresponding to Table 2) shown in FIG. 2, that of the inorganic ion exchange material powder 7 obtained in Example 7 (corresponding to Table 3) shown in FIG. 3, and that of the inorganic ion exchange material powder 9 obtained in Example 9 (corresponding to Table 4) shown in FIG. 4.
(4) Raman scattering spectra Raman scattering spectra are obtained by using the Fourier transform Raman spectrophotometer JSR-FT6500 model (manufactured by JEOL Ltd.; excitation light source: YAG laser; wavelength: 1064 nm; detector: InGaAs type; resolution: wavenumber=2 $cm^{-1}$, integrated frequency= 500). Raman scattering spectra of the inorganic ion exchange material powders 9 and 7 obtained in Examples 9 and 7 are respectively shown in FIGS. 5 and 6, and that of the comparative ion exchange material powder 1 obtained in Comparative Example 1 is shown in FIG. 7.

Example 1

No. 1 sodium silicate ($SiO_2/Na_2O$=2.14; moisture content: 44.9%), sodium hydroxide and potassium hydroxide are dissolved to provide the composition shown in Table 5. To this solution, finely milled anhydrous calcium carbonate and anhydrous magnesium carbonate are added and mixed using a homomixer. A given amount of the mixture is transferred into a nickel crucible and baked in the air at a temperature of 600° C. for 2 hours, followed by rapid cooling. The obtained baked product is milled to yield an inorganic ion exchange material powder 1. The obtained powder is analyzed for cationic exchange capacity and cationic exchange speed. As shown in Table 5, the powder material is found to have a high cationic exchange capacity and a high cationic exchange speed.

Example 5

Inorganic ion exchange material powder 5 having the composition shown in Table 5 is obtained in the same manner as in Example 1 except that the baking temperature of 650° C. is employed. The obtained powder is analyzed for cationic exchange capacity and cationic exchange speed. As shown in Table 5, the powder material has a high cationic exchange capacity and a high cationic exchange speed.

TABLE 5

| Example | b/a | c/a | K/Na | Mg/Ca | $K_2O/SiO_2$ | Main X-ray diffraction pattern | Raman main peaks ($cm^{-1}$) 1st. | 2nd. | 3rd. | CEC $CaCO_3$ mg/g | CE speed $CaCO_3$ mg/g · min |
|---|---|---|---|---|---|---|---|---|---|---|---|
| 1 | 1.80 | 0.020 | 0.168 | 0.05 | 0.08 | Table 2 | 1058 | 1080 | 970 | 306 | 134 |
| 2 | 1.80 | 0.200 | 0.305 | 50.0 | 0.13 | Table 3 | 1058 | 1080 | 969 | 284 | 125 |
| 3 | 1.80 | 0.006 | 0.479 | 0.05 | 0.18 | Table 3 | 1079 | 1059 | 969 | 322 | 168 |
| 4 | 1.80 | 0.150 | 0.656 | 0.08 | 0.22 | Table 3 | 1079 | 1059 | 968 | 285 | 135 |
| 5 | 1.70 | 0.100 | 0.114 | 0.12 | 0.06 | Table 1 | 1058 | 1080 | 970 | 276 | 118 |
| 6 | 1.70 | 0.010 | 0.256 | 0.18 | 0.12 | Table 3 | 1079 | 1059 | 970 | 333 | 152 |
| 7 | 1.70 | 0.050 | 0.342 | 0.50 | 0.15 | Table 3 | 1080 | 970 | | 330 | 144 |
| 8 | 1.70 | 0.250 | 0.515 | 0.07 | 0.20 | Table 3 | 1080 | 969 | | 271 | 111 |
| 9 | 2.00 | 0.008 | 0.429 | 0.15 | 0.15 | Table 4 | 1080 | | | 368 | 172 |

Example 2

Inorganic ion exchange material powder 2 is obtained in the same manner as in Example 1 except that No. 2 sodium silicate ($SiO_2/Na_2O=2.55$; moisture content: 59.9%) is used in place of No. 1 sodium silicate to provide the composition shown in Table 5. The obtained powder is analyzed for cationic exchange capacity and cationic exchange speed. As shown in Table 5, the powder material has a high cationic exchange capacity and a high cationic exchange speed.

Example 3

Inorganic ion exchange material powder 3 is obtained in the same manner as in Example 1 except that No. 3 sodium silicate ($SiO_2/Na_2O=3.18$; moisture content: 61.7%) is used in place of No. 1 sodium silicate to provide the composition shown in Table 5. The obtained powder is analyzed for cationic exchange capacity and cationic exchange speed. As shown in Table 5, the powder material has a high cationic exchange capacity and a high cationic exchange speed.

Example 4

Inorganic ion exchange material powder 4 is obtained in the same manner as in Example 3 except that calcium nitrate and magnesium nitrate are used in place of anhydrous calcium carbonate and anhydrous magnesium carbonate to provide the composition shown in Table 5. The obtained powder is analyzed for cationic exchange capacity and cationic exchange speed. As shown in Table 5, the powder material has a high cationic exchange capacity and a high cationic exchange speed.

Examples 6 and 7

Inorganic ion exchange material powders 6 and 7 having the compositions shown in Table 5 are obtained in the same manner as in Example 2 except that the baking temperature of 550° C. is employed. The obtained powders are analyzed for cationic exchange capacity and cationic exchange speed. As shown in Table 5, both of the powder materials have a high cationic exchange capacity and a high cationic exchange speed.

Examples 8 and 9

Inorganic ion exchange material powders 8 and 9 having the compositions shown in Table 5 are obtained in the same manner as in Example 3 except that the baking temperature of 550° C. is employed. The obtained powders are analyzed for cationic exchange capacity and cationic exchange speed. As shown in Table 5, both of the powder materials have a high cationic exchange capacity and a high cationic exchange speed.

Examples 10 and 11

Inorganic ion exchange material powders 10 and 11 having the compositions shown in Table 6 are obtained in the same manner as in Example 4 except that the baking temperature of 550° C. is employed. The obtained powders are analyzed for cationic exchange capacity and cationic exchange speed. As shown in Table 6, both of the powder materials have a high cationic exchange capacity and a high cationic exchange speed.

TABLE 6

| Example | b/a | c/a | K/Na | Mg/Ca | K$_2$O/SiO$_2$ | Main X-ray diffraction pattern | Raman main peaks (cm$^{-1}$) 1st. | 2nd. | 3rd. | CEC CaCO$_3$ mg/g | CE speed CaCO$_3$ mg/g·min |
|---|---|---|---|---|---|---|---|---|---|---|---|
| 10 | 1.90 | 0.040 | 0.235 | 0.10 | 0.10 | Table 2 | 1058 | 1080 |  | 304 | 136 |
| 11 | 1.90 | 0.002 | 0.613 | 0 | 0.20 | Table 4 | 1079 |  |  | 358 | 188 |
| 12 | 1.75 | 0.010 | 0.724 | 1.00 | 0.24 | Table 3 | 1080 | 1058 | 970 | 290 | 122 |
| 13 | 1.75 | 0.300 | 0.325 | 2.00 | 0.14 | Table 3 | 1080 | 1059 | 968 | 262 | 106 |
| 14 | 1.60 | 0.080 | 0.190 | 0.10 | 0.10 | Table 2 | 1057 | 1079 | 970 | 275 | 119 |
| 15 | 1.60 | 0.350 | 0.404 | 95.0 | 0.18 | Table 3 | 1079 | 970 | 1058 | 255 | 123 |
| 16 | 1.60 | 0.100 | 0.582 | 10.0 | 0.23 | Table 3 | 1080 | 970 | 1059 | 260 | 192 |
| 17 | 1.50 | 0.008 | 0.176 | 0.25 | 0.10 | Table 2 | 969 | 1080 | 1059 | 286 | 125 |
| 18 | 1.50 | 0.030 | 0.342 | 5.00 | 0.17 | Table 3 | 969 | 1080 |  | 274 | 116 |
| 19 | 1.40 | 0.010 | 0.266 | 0.33 | 0.15 | Table 3 | 968 | 1079 |  | 275 | 123 |

Examples 12 and 13

Inorganic ion exchange material powders 12 and 13 having the compositions shown in Table 6 are obtained in the same manner as in Example 4 except that calcium chloride and magnesium chloride are used in place of calcium nitrate and magnesium nitrate in order to add calcium and magnesium components to the compositions. The obtained powders are analyzed for cationic exchange capacity and cationic exchange speed. As shown in Table 6, the powder materials have a high cationic exchange capacity and a high cationic exchange speed.

Example 14

Silica sand (SiO$_2$ purity: 99.7%), sodium carbonate, potassium carbonate, anhydrous calcium carbonate and anhydrous magnesium carbonate are mixed using a ball-mill to provide the composition as shown in Table 6. This mixture is melted at a temperature of 1300° C. for 20 hours, followed by rapid cooling to obtain cullets. After milling the cullets, the cullets passing through a sieve with 150 μm pore size are mixed with water, and a given amount of the mixture is transferred into a nickel crucible and baked at a temperature of 600° C. for 2 hours, followed by rapid cooling. The obtained baked product is milled to yield inorganic ion exchange material powder 14. The obtained powder is analyzed for cationic exchange capacity and cationic exchange speed. As shown in Table 6, the powder material is found to have a high cationic exchange capacity and a high cationic exchange speed.

Examples 15 and 16

Inorganic ion exchange material powders 15 and 16 having the compositions shown in Table 6 are obtained in the same manner as in Example 14 except that the baking temperature of 550° C. is employed. The obtained powders are analyzed for cationic exchange capacity and cationic exchange speed. As shown in Table 6, the powder materials have a high cationic exchange capacity and a high cationic exchange speed.

Examples 17 through 19

Cullets having the composition shown in Table 6 are prepared in the same manner as in Example 14. After milling, the cullets passing through a sieve with 1 mm pore size is mixed with water, and this mixture is subjected to a hydrothermal treatment in an autoclave at a pressure of 2 kg/cm$^2$ for 30 minutes. A given amount of the treated mixture is transferred into a nickel crucible and baked at a temperature of 550° C. for 1 hour, followed by rapid cooling. The obtained baked product is milled to yield inorganic ion exchange material powders 17 through 19. The obtained powders are analyzed for cationic exchange capacity and cationic exchange speed. As shown in Table 6, the powder materials are found to have a high cationic exchange capacity and a high cationic exchange speed.

Comparative Example 1

No. 2 sodium silicate and sodium hydroxide are mixed to provide the compositions shown in Table 7. The mixture is baked at a temperature of 700° C. to obtain a comparative ion exchange material powder 1. The powder is analyzed by X-ray diffraction and shows no patterns shown in Tables 1 to 4. Raman scattering spectrometry fails to confirm the peak at 1080±6 cm$^{-1}$, only showing at 1058±6 cm$^{-1}$ and slight peaks at 968±6 cm$^{-1}$ (FIG. 7). The cationic exchange capacity of the comparative powder material is 224 CaCO$_3$ mg/g, falling in the range of not more than 240 CaCO$_3$ mg/g.

Comparative Examples 2 and 3

No. 2 sodium silicate, sodium hydroxide, potassium hydroxide, calcium hydroxide and magnesium hydroxide are mixed to provide the compositions shown in Table 7. Comparative ion exchange material powders 2 and 3 as shown in Table 7 are respectively obtained by baking at 700° C. for 2 hours in Comparative Example 2, and by baking at 600° C. for 2 hours in Comparative Example 3. These powders are analyzed for cationic exchange capacity and cationic exchange speed. The results indicate that though these powder materials have a high cationic exchange capacity, their cationic exchange speed is low.

Comparative Example 4

A comparative ion exchange material powder 4 is obtained in the same manner as in Comparative Example 1 except that the amount of sodium hydroxide added is changed to provide the composition shown in Table 7.

Comparative Example 5

No. 1 sodium silicate (SiO$_2$/Na$_2$O=2.14; moisture content: 44.9%), sodium hydroxide, potassium hydroxide, anhydrous calcium carbonate and magnesium hydroxide are mixed to provide the composition shown in Table 7. The mixture is baked at a temperature of 600° C. for 3 hours to obtain a comparative ion exchange material powder 5. The obtained powder is analyzed for X-ray diffraction, Raman spectrum, cationic exchange capacity, and cationic exchange speed. The results of the analyses are given in Table 7. Although the powder material shows a high cationic exchange capacity, its cationic exchange speed is comparatively low.

Comparative Examples 6 and 7

Comparative ion exchange material powders 6 and 7 are obtained in the same manner as in Comparative Example 5 except that magnesium carbonate is used in place of magnesium hydroxide. The obtained powders are analyzed for X-ray diffraction, Raman spectrum, cationic exchange capacity, and cationic exchange speed. The results of the analyses are given in Table 7. Although both of the powder materials show a high cationic exchange capacity, their cationic exchange speeds are comparatively low.

Comparative Example 8

A comparative ion exchange material powder 8 is obtained by baking at 650° C. in the same manner as in Comparative Example 5 except that powdery No. 1 sodium silicate having a different composition ($SiO_2/Na_2O=2.11$; moisture content: 22.1%) is used. The obtained powder is analyzed for X-ray diffraction, Raman spectrum, cationic exchange capacity, and cationic exchange speed. The results of the analyses are given in Table 7. Although the powder material shows a high cationic exchange capacity, its cationic exchange speed is comparatively low.

Comparative Examples 9 and 10

325 mesh-passed silica rock powder, potassium hydroxide, calcium carbonate and magnesium hydroxide are mixed using a type V mixer to provide the compositions as shown in Table 7. This mixture is melted at a temperature of 1300° C. for 8 hours, followed by rapid cooling to obtain cullets. After milling the cullets, cullets on a 100-mesh sieve are subjected to a hydrothermal treatment at a pressure of 3 kg/cm² for 1 hour using an autoclave to yield water glass. Each water glass obtained is baked at 650° C. for 1 hour to obtain comparative ion exchange material powders 9 and 10. The obtained powders are analyzed for X-ray diffraction, Raman spectrum, cationic exchange capacity, and cationic exchange speed. The results are given in Table 7. Although both of the powder materials show a high cationic exchange capacity, their cationic exchange speeds are comparatively low.

Comparative Example 11

A comparative ion exchange material powder 11 is obtained in the same manner as in Comparative Example 9 except that powdery silica sand ($SiO_2$ purity 99.7%) is used in place of silica rock powder. The obtained powder is analyzed for X-ray diffraction, Raman spectrum, cationic exchange capacity, and cationic exchange speed. The results of the analyses are given in Table 7. Although the powder material shows a high cationic exchange capacity, its cationic exchange speed is comparatively low.

Comparative Examples 12 and 13

Comparative ion exchange material powders 12 and 13 are obtained in the same manner as in Comparative Example 9 except that magnesium carbonate is used in place of magnesium hydroxide. The obtained powders are analyzed for X-ray diffraction, Raman spectrum, cationic exchange capacity, and cationic exchange speed. The results of the analyses are given in Table 7. Although both of the powder materials show a high cationic exchange capacity, their cationic exchange speeds are comparatively low.

Comparative Example 14

To 100 parts by weight of No. 1 sodium silicate ($SiO_2/Na_2O=2.14$; moisture content: 44.9%), sodium hydroxide and potassium hydroxide are added together, followed by stirring using a homomixer to dissolve sodium hydroxide and potassium hydroxide. To this solution, finely milled anhydrous calcium carbonate and magnesium hydroxide are added together, and they are mixed by using a homomixer to provide the composition shown in Table 7. A given amount of the mixture is transferred into a nickel crucible and baked in the air at a temperature of 700° C. for 1 hour, followed by rapid cooling. The obtained baked product is milled to yield a comparative ion exchange material powder 14. The obtained powder is analyzed for X-ray diffraction, Raman spectrum, cationic exchange capacity, and cationic exchange speed. The results of the analyses are given in Table 7. Although the powder material shows a high cationic exchange capacity, its cationic exchange speed is comparatively low.

Comparative Example 15

325 mesh-passed silica rock powder ($SiO_2$ purity: 99.9%), sodium hydroxide, potassium hydroxide, anhydrous calcium carbonate, and magnesium hydroxide are added together and mixed by using a ball-mill to provide the composition shown in Table 7. This mixture is melted at a temperature of 1300° C. for 8 hours, followed by rapid cooling to obtain cullets. To 1 part by weight of the cullets exceeding 100 mesh, 5 parts by weight of ion exchange water is added, and the mixture is subjected to a hydrothermal treatment at a pressure of 3 kg/cm² for 1 hour using an autoclave to yield water glass. A given amount of the water glass is transferred into a nickel crucible and baked in the air at a temperature of 650° C. for 1 hour, followed by rapid cooling. The obtained baked product is milled to yield a comparative ion exchange material powder 15. The obtained powder is analyzed for X-ray diffraction, Raman spectrum, cationic exchange capacity, and cationic exchange speed. The results of the analyses are given in Table 7. Although the powder material shows a high cationic exchange capacity, its cationic exchange speed is comparatively low.

Comparative Example 16

Silica sand ($SiO_2$ purity: 99.7%), sodium hydroxide, potassium hydroxide, anhydrous calcium carbonate, and magnesium hydroxide are mixed by using a ball-mill to provide the composition shown in Table 7. The mixture is melted at a temperature of 1300° C. for 20 hours, followed by rapid cooling to obtain a glassified product (cullets). To 1 part by weight of the 100 mesh-passed cullets, 4 parts by weight of ion exchange water is added, and a given amount of the mixture is transferred into a nickel crucible and baked in the air at a temperature of 600° C. for 2 hours, followed by rapid cooling. The obtained baked product is milled to yield a comparative ion exchange material 16. The obtained powder is analyzed for X-ray diffraction, Raman spectrum, cationic exchange capacity, and cationic exchange speed. The results of the analyses are given in Table 7. Although the powder material shows a high cationic exchange capacity, its cationic exchange speed is comparatively low.

Comparative Example 17

No. 2 sodium silicate ($SiO_2/Na_2O=2.55$; moisture content: 59.9%), potassium hydroxide, and sodium hydroxide are added, followed by stirring using a homomixer to dissolve potassium hydroxide and sodium hydroxide. To this solution, finely milled anhydrous calcium carbonate and anhydrous magnesium carbonate are added together, and they are mixed by using a homomixer to provide the composition shown in Table 7. A given amount of the mixture is transferred into a nickel crucible and baked in the air at a temperature of 700° C. for 1 hour, followed by rapid cooling. The obtained baked product is milled to yield a comparative ion exchange material 17. The obtained powder is analyzed for X-ray diffraction, Raman spectrum, cationic exchange capacity, and cationic exchange speed. The results of the analyses are given in Table 7. Although the powder material shows a high cationic exchange capacity, its cationic exchange speed is comparatively low.

TABLE 8

| | Detergent Composition | | | |
|---|---|---|---|---|
| | (Present invention) | | (Comparative example) | |
| | A | B | C | D |
| Polyoxyethylene dodecyl ether (EOP = 8) | 25 | 25 | 25 | 25 |
| Zeolite (Inorganic ion exchange material A) | — | — | 30 | — |
| Amorphous silica (TOKUSIL™) | 15 | 15 | 15 | 15 |
| Sodium carbonate | 3 | 3 | 23 | 8 |
| Sodium sulfate | — | — | 5 | — |
| Inorganic ion exchange material powder 7 | 30 | — | — | — |
| Inorganic ion exchange material powder 9 | — | 30 | — | — |
| Comparative ion exchange material powder 15 | — | — | — | 35 |
| Water | 2 | 2 | 2 | 2 |
| Total | 75 | 75 | 100 | 85 |

TABLE 7

| Comparative Example | b/a | c/a | K/Na | Mg/Ca | $K_2O/SiO_2$ | Main X-ray diffraction pattern | Raman main peaks ($cm^{-1}$) 1st. | 2nd. | 3rd. | CEC $CaCO_3$ mg/g | CE speed $CaCO_3$ mg/g · min |
|---|---|---|---|---|---|---|---|---|---|---|---|
| 1 | 2.0 | — | — | — | — | * | 1060 | 968 | — | 224 | 69 |
| 2 | 1.20 | 0.10 | 0.04 | 0.50 | 0.03 | * | n.t. | n.t. | n.t. | 260 | 68 |
| 3 | 1.00 | 0.04 | 0.10 | 0.10 | 0.09 | * | n.t. | n.t. | n.t. | 330 | 59 |
| 4 | 2.05 | — | — | — | — | * | 1058 | — | — | 234 | 73 |
| 5 | 1.70 | 0.020 | 0.03 | 0.02 | 0.02 | Table 1 | 1058 | 968 | — | 306 | 106 |
| 6 | 1.50 | 0.150 | 1.25 | 3.00 | 0.37 | * | 968 | 1079 | 1058 | 258 | 86 |
| 7 | 1.75 | 0.080 | 0.06 | 0.25 | 0.03 | Table 1 | 1058 | 968 | — | 301 | 92 |
| 8 | 1.60 | 0.100 | 2.50 | 1.25 | 0.45 | * | 1080 | 968 | 1058 | 311 | 97 |
| 9 | 1.80 | 0.020 | 0.04 | 0.01 | 0.02 | Table 1 | 968 | 1059 | 1078 | 310 | 97 |
| 10 | 1.50 | 0.300 | 2.00 | 9.00 | 0.44 | * | 968 | 1080 | 1058 | 498 | 99 |
| 11 | 1.75 | 0.010 | 0.01 | 0.50 | 0.01 | Table 1 | 1058 | 969 | — | 328 | 92 |
| 12 | 1.70 | 0.100 | 3.30 | 0.80 | 0.45 | * | 1078 | 1059 | 968 | 325 | 88 |
| 13 | 1.55 | 0.050 | 3.00 | 3.00 | 0.48 | * | 968 | 1079 | 1058 | 488 | 87 |
| 14 | 1.50 | 0.050 | 1.03 | 0.50 | 0.34 | * | 1078 | 970 | 1100 | 326 | 98 |
| 15 | 2.00 | 0.006 | 0.10 | 0.20 | 0.05 | * | 1060 | 968 | — | 248 | 89 |
| 16 | 1.75 | 0.006 | 0.10 | 0.05 | 0.05 | Table 1 | 1059 | 969 | — | 333 | 92 |
| 17 | 1.70 | 0.020 | 0.25 | Mg only | 0.118 | Table 2 | 1060 | 1079 | 970 | 307 | 95 |

*: Patterns in Tables 1 to 4 are not obtained.
n.t.: not tested.

Preparation Example of Detergent Compositions

Detergent compositions having compositions shown in Table 8 are prepared by the following methods. Here, Detergent Compositions A and B are the present inventive products containing the inorganic ion exchange materials of the present invention, and Detergent Composition C is a comparative product which does not contain the inorganic ion exchange material of the present invention. Detergent Composition D is a comparative product which contains a comparative ion exchange material powder 15.

Specifically, powdery starting materials comprising sodium carbonate, sodium sulfate, amorphous silica and inorganic ion exchange material are placed in a tumbling mixer granulator (Lödige mixer), and polyoxyethylene dodecyl ether is added thereto to yield powdery detergent compositions of an average grain size of 386 to 423 μm.

TABLE 8-continued

| | Detergent Composition | | | |
|---|---|---|---|---|
| | (Present invention) | | (Comparative example) | |
| | A | B | C | D |
| Detergency Rate (%) for | | | | |
| cloth stained with mud and dirt | 72.3 | 71.2 | 69.4 | 69.9 |
| cloth stained with sebum | 73.8 | 72.5 | 69.9 | 71.3 |

Note: To clearly distinguish the difference in composition ratios from Detergent Compositions C and D, whose total amounts are 100 and 85 parts by weight, respectively, the total amounts of Detergent Compositions A and B are 75 parts by weight, respectively.

Test Example

Detergent Compositions A through D obtained in the above-described Preparation Example of Detergent Compositions are used to carry out a detergency test by the following methods:

(1) Mud and Dirt Stained Clothes (Artificially Stained Clothes):

"Kanuma sekigyoku soil" for horticultural use is dried at 120° C.±5° C. for 4 hours and then finely pulverized. 150 mesh (100 μm)-passed soil particles are dried at 120° C.±5° C. for 2 hours. 150 g of the soil is dispersed in 1000 liters of tetrachloroethylene. A calico #2023 cloth is contacted with the dispersion and brushed. After removal of the dispersion, excessively adhered stain is removed (Japanese Patent Laid-Open No. 55-26473).

(2) Sebum/Carbon Stained Clothes (Artificially Stained Clothes):

| (Model Sebum/Carbon Dirt Composition) | |
| --- | --- |
| Carbon black | 15% |
| Cotton seed oil | 60% |
| Cholesterol | 5% |
| Oleic acid | 5% |
| Palmitic acid | 5% |
| Liquid paraffin | 10% |

1 kg of the above-described composition is dissolved and dispersed in 80 liters of tetrachloroethylene. A calico #2023 cloth is immersed therein to adhere the stains, and tetrachloroethylene is removed by drying.

(3) Detergency Conditions

To 1 liter of aqueous solution of detergents for evaluation, five 10 cm×10 cm pieces each of mud-dirt stained cotton cloth and sebum/carbon stained cotton cloth are placed therein, and they are washed using a turgometer at 100 rpm under the following detergency conditions:

| (Detergency Conditions) | |
| --- | --- |
| Detergency Time | 10 minutes |
| Concentration of Detergent | 0.133% |
| Hardness of Water | 4° |
| Water Temperature | 20° C. |
| Rinsing | In tap water for 5 minutes |

(4) Evaluation Method of Detergency Test

Reflectivities of the original cloth before staining and those of the stained cloth before and after the washing are measured at 460 nm by means of an automatic recording colorimeter (manufactured by Shimadzu Corporation), and the detergency rate (%) is calculated by the following equation.

$$\text{Detergency Rate (\%)} = \frac{\text{Reflectivity after washing} - \text{Reflectivity before washing}}{\text{Reflectivity of the original cloth} - \text{Reflectivity before washing}} \times 100$$

The obtained results are shown in the bottom column of Table 8. It has been confirmed that excellent washing performance can be achieved by using the detergent compositions of the present invention. Since the inorganic ion exchange material of the present invention has a high alkaline capacity as well as a high cationic exchange capacity and a high cationic exchange speed, it can exhibit a high washing performance even if the amount of alkalinity adjusting agent such as sodium carbonate is greatly reduced.

Particularly, since cationic exchange capacity and cationic exchange speed are high, remarkably high washing performance for mud-dirt stain and sebum stain can be achieved.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A synthesized inorganic crystalline ion exchange material comprising a composition having the following general formula in an anhydride form:

$$aX_2O \cdot bSiO_2 \cdot cX'O,$$

wherein X represents Na and K; X' represents Ca, or Ca and Mg; b/a is 1.4 to 2.1; c/a is 0.001 to 0.35; K/Na, expressed in (molar ratio), in $X_2O$ is 0.09 to 1.11; Mg/Ca, expressed in (molar ratio, in X'O is 0 to 100; and $KO/SiO_2$, expressed in (molar ratio), is 0.06 to 0.25, wherein the synthesized inorganic crystalline ion exchange material exhibits main shift peaks at least at 1080±6 cm$^{-1}$ in Raman scattering spectra in the range of from 900 to 1200 cm$^{-1}$ and exhibits a cation exchange speed of from 110 to 250 $CaCO_3$ mg/g.minute.

2. A synthesized inorganic crystalline ion exchange material comprising a composition having the following general formula in an anhydride form:

$$aX_2O \cdot bSiO_2 \cdot cX'O,$$

wherein X represents Na and K; X' represents Ca, or Ca and Mg; b/a is 1.4 to 2.1; c/a is 0.002 to 0.20; K/Na, expressed in (molar ratio), in $X_2O$ is 0.09 to 1.11; Mg/Ca, expressed in (molar ratio), in X'O is 0 to 100; and $K_2O/SiO_2$, expressed in (molar ratio), is 0.06 to 0.25, wherein the synthesized inorganic crystalline ion exchange material exhibits main shift peaks at least at 1080±6 cm$^{-1}$ in Raman scattering spectra in the range of from 900 to 1200 cm$^{-1}$ and exhibits a cation exchange speed of from 110 to 250 $CaCO_3$ mg/g.minute.

3. The synthesized inorganic crystalline ion exchange material according to claim 1, wherein the cationic exchange capacity of the synthesized inorganic crystalline ion exchange material is 240 to 600 $CaCO_3$ mg/g.

4. The synthesized inorganic crystalline ion exchange material according to claim 2, wherein the cationic exchange capacity of the synthesized inorganic crystalline ion exchange material is 240 to 600 $CaCO_3$ mg/g.

5. A hydrate containing the synthesized inorganic crystalline ion exchange material according to claim 1.

6. A hydrate containing the synthesized inorganic crystalline ion exchange material according to claim 2.

7. A detergent composition containing the synthesized inorganic crystalline ion exchange material according to claim 1.

8. A detergent composition containing the synthesized inorganic crystalline ion exchange material according to claim 2.

* * * * *